United States Patent [19]

Brady

[11] Patent Number: 4,542,265
[45] Date of Patent: Sep. 17, 1985

[54] ECHO CANCELLER DYNAMIC RANGE EXTENSION

[75] Inventor: Douglas M. Brady, Boulder, Colo.

[73] Assignee: GTE Lenkurt Incorporated, Phoenix, Ariz.

[21] Appl. No.: 496,730

[22] Filed: May 20, 1983

[51] Int. Cl.[4] ............................................. H04B 3/20
[52] U.S. Cl. ................................................. 179/170.2
[58] Field of Search ............... 179/170.2, 170.6, 170.8; 381/106

[56] References Cited

U.S. PATENT DOCUMENTS

| | | | |
|---|---|---|---|
| 3,780,233 | 12/1973 | Campenella et al. ............. | 179/170.2 |
| 4,064,379 | 12/1977 | Horna ............................... | 179/170.2 |
| 4,467,146 | 8/1984 | Lassaux ............................ | 179/170.2 |

Primary Examiner—Thomas W. Brown
Assistant Examiner—B. Vaas
Attorney, Agent, or Firm—Russell A. Cannon

[57] ABSTRACT

Echo cancellers provide echo return loss enhancement by subtracting a replica of the echo signal from the echo returned via the two-wire to four-wire transition. The echo replica is derived from the signal incoming from the far end by signal processing which consists of a convolution and adaptive modeling that is used to model echo paths caused by the imperfections of the two-wire to four-wire transition. An improved echo return loss enhancement (ERLE) is obtained by dynamic range compression of the incoming signal prior to processing and dynamic range extension following processing. The range extension is slaved to a control signal from the ranged compressor, providing proper compensation for the compressed signal, but insuring that processing noise and other extraneous signals have been adversely treated.

3 Claims, 3 Drawing Figures

ECHO CANCELLER DYNAMIC RANGE EXTENSION

BACKGROUND OF THE INVENTION

1. Field of the Invention

This invention relates to echo cancellers, and more particularly to a technique by which the echo return loss enhancement is improved.

2. Background Description

Prior to the use of satellite communication circuits, the echo generated at the hybrid, in telephone connections that involve both four-wire and two-wire links, was most commonly accommodated by using echo suppressors. These devices either prevented the reflected (echo) signal from returning to the talker or severely restricted the amplitude of this unwanted signal. This was accomplished by either opening the return circuit path or by inserting a fairly high impedance in the circuit to reduce the amplitude of this unwanted signal. Although this is somewhat annoying (because responses from the listener may be blocked) thus preventing an appearance of face to face communication effective communication could be obtained and thus the slight inconveniences introduced by the use of such echo suppressors was tolerated.

But the disturbing influence on conversation which appears to increase with increased round-trip delay required that other techniques be employed to reduce the echo effect in conversation. Thus echo cancellers were introduced and these operate, not by opening the return path, but by developing a replica of the echo signal in a signal processor and providing this replica of the echo at the appropriate time to one input of a summing device in the return or transmit path from the two-wire to four-wire transition or hybrid. If the characteristic and time of presentation of the echo replica is sufficiently exact the summation will cancel the echo in the return path to the talker. Such echo cancelling systems are well known and many different types have been devised. One such device is disclosed in U.S. Pat. No. 3,500,000, granted Mar. 10, 1970, John L. Kelly, Jr. et al, for a "Self-Adaptive Echo Canceller". In one embodiment, a signal-cancelling echo suppressor employs a self-adjusting transversal filter which is supplied with signals incoming to a four-wire to a two-wire junction. The error signals, derived by processing signals in the outgoing path, continuously control the adjustment of the transversal filter so that the filter produces a replica of an undesired echo at its output. The replica signal is then subtracted from the outgoing signals and the differential is used as a new error signal for controlling the transversal filter. Other devices employ digital techniques to perform the desired signal processing and, in a number of cases, step-wise linear encoding of the signal amplitudes is employed in order to derive a pseudo-logrithmic effect. By so doing a companding effect is introduced. Further, the coding error is reduced for low level signals, but increases the coding error for full scale or high level signals. In addition, the signal processing algorithm behavior may introduce noise, which is more detrimental at the low signal levels. There are also a number of the echo cancellers of the prior art which provide echo return loss enhancement for medium and high level signals, but which do not provide the requisite echo return loss enhancement for low level signals. In some telephone networks using echo cancellers, low signal levels are frequently encountered. Echo cancellers should be effective for speech levels below −30 DBMO, which is not always the case.

SUMMARY OF THE INVENTION

In an echo canceller, a dynamic range compressor is used to reduce the amplitude range and to increase the amplitude of low level signals prior to application of said signals to the signal processing portion of the echo canceller, and a dynamic range extender is used following said signal processing. To recover the original dynamic range, the extender range is controlled by a control signal derived in the compressor.

DETAILED DESCRIPTION OF THE INVENTION

Figure 1:
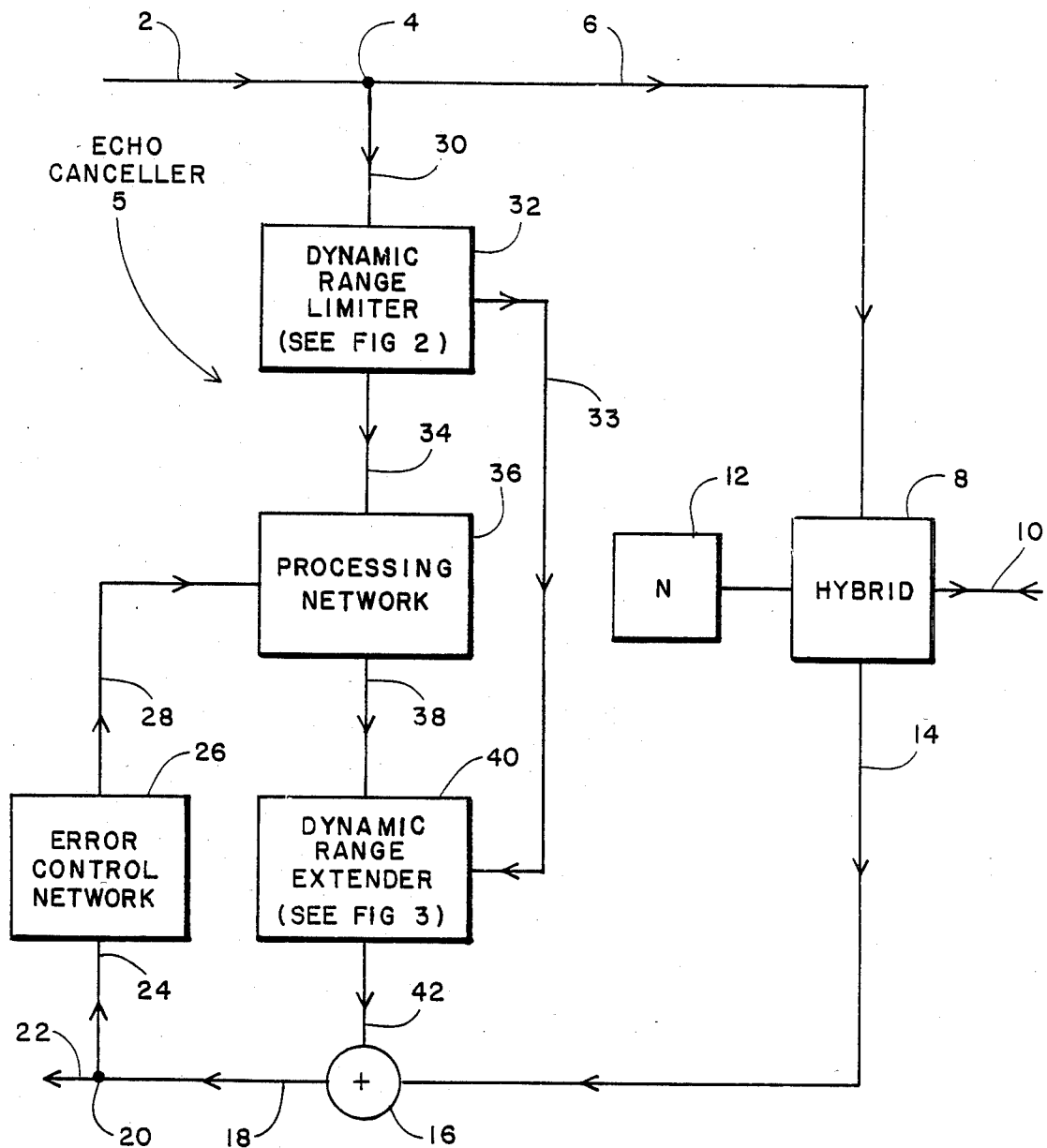
FIG. 1 is a block diagram illustrating one end of a telecommunications network and the use of a dynamic range limiter and dynamic range extender in an echo canceller.

In the block diagram shown in FIG. 1, a simplified version of the eastern end of a long distance communication circuit is depicted. Long distance communication networks commonly employ four-wire transmission, as shown; and hybrid networks such as 8 are employed to interface the two-wire to the four-wire circuits in the long distance communication networks. The incoming signals from the far or west end of the circuit appear on path 2, pass via junction 4 and path 6 to the input of hybrid 8 where they are applied to the two-wire circuit 10; and because the four-wire to two-wire transition is not perfect an echo signal will appear on path 14 and will be applied to summing circuit 16. The basic elements of echo canceller 5 consist of the processing network 36, summing network 16, and the error control network 26 which provides feedback to the processing network in order to correct for errors in the echo cancellation. Operation of these elements in such combinations are well known. Analog cancelling techniques such as are disclosed and described in an article by M. M. Sondhi, "An Adaptive Echo Canceller", Bell Systems Technical Journal, Vol. 46, No. 3, March 1967, pp. 497–511, may provide echo cancellation of about 20 dB, with a convergence time of between 0.2 to 0.5 seconds for average speech levels. However, analog delay lines are difficult to implement where round-trip delays of several tens of milliseconds are involved.

One way in which the problems associated with analog techniques may be overcome is by use of digital "echo cancellers", i.e., echo cancellers which use digital techniques inside of the operational loop. Such a technique has been described in an article by S. J. Campanella et al, "Analysis of an Adaptive Impulse Response Echo Canceller", COMSAT Technical Review, Vol. 2, No. 1, Spring 1972. While the basic approach of the digital echo canceller is sound, it is a highly complex and very expensive system. The principal reason for the complexity and high cost of the digital echo canceller is the broad dynamic range of the speech and long round-trip delay between the hybrid and the echo cancelling device. For acceptable results with different levels of signals, the speech must be sampled, stored and processed with 11 to 12 bits of precision.

One way in which to overcome the deficiencies of the prior art devices is to provide pseudo-logarithmic coding of the digital signal and such an approach is disclosed in U.S. Pat. No. 4,064,379, granted Dec. 20, 1977 to O. A. Horna.

By using the technique of this invention, a similar result may be obtained. It is well known that the dynamic range of speech signals is in the order of 40 dB. But the echo return loss enhancement effected by the echo canceller employing linear signal processing techniques drops below an acceptable level for the low level signals. One technique to overcome this problem was the use of logrithmic coding, either according to the A-law or μ-law encoding technique. In the present invention, the dynamic range of the incoming signal on path 2 is reduced by dynamic range limiter 32 prior to application of the compressed range signal via path 34 to the signal processing network 36.

Dynamic range limiting techniques are well known and their use in syllabic companders is well documented. In particular, reference may be made to the text "Transmission Systems For Communications", Revised 4th Edition, published by Bell Telephone Laboratories, Inc., December 1971, pp. 677-682 for a discussion of such devices. Because the improvement in echo return loss enhancement is primarily required for low incoming signal level conditions, the 2:1 compression ratio employed in standard syllabic companders for communication networks is employed in a preferred embodiment of the invention. Further, the unaffected level is also set for +5 dB and the signals above that level are actually expanded. Thus a signal that is 20 dB below the unaffected level comes out of the dynamic range limiter 32 at a level that is only 10 dB below the unaffected level. A signal that is 6 dB above the unaffected level when applied to the input of the dynamic range limiter 32, however, will come out at a level which is 3 dB above the unaffected level.

The range limited input signal is applied via path 34 to processing network 36 which consists of a convolution and adaptive modeling system used to model the echo paths caused by the two-wire to four-wire transition. As noted hereinabove such analog processing networks are well known and will not be discussed further here. The processed output is a representation of the negative of the input signal. This processed signal appears on path 38 where it is applied to the dynamic range extender 40.

The dynamic range extender or expander 40 is the complement of the dynamic range limiter in that it expands the signal in a 2:1 ratio in a preferred embodiment of the invention. This is also done in a syllabic manner, however the control signal for the dynamic range extender is derived in the dynamic range limiter circuit. The extender is thus slaved to the range limiter and will introduce loss to the input signal which is equal to the gain provided by the limiter, and at all levels of operation below the unaffected level. In order to obtain linear operation, the compressor and expander must be in the circuit together. For low level signals, the compressor gain is high and the expander loss is high. Thus, since the expander is located after the echo path model in the circuitry, noise introduced by both algorithm behavior in the echo canceller and any other extraneous noise sources are reduced by the amount of the expander loss.

Figure 2:
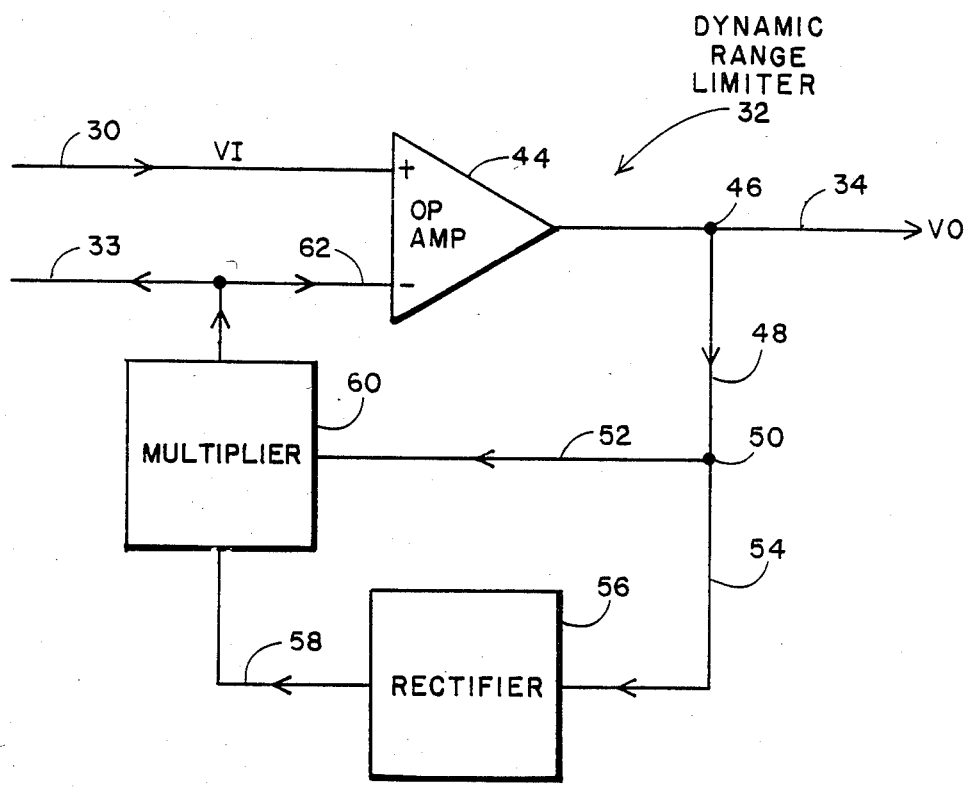
FIG. 2 is a block diagram of one dynamic range limiter that is employed in a preferred embodiment of the invention.

Techniques by which the dynamic range limiting may be obtained are well known and one such device is illustrated in FIG. 2. Here the input signal on path 2, is applied via path 30 as the VI input to the non-inverting input of operational amplifier 44. The operational amplifier output appears on path 34 and is applied via junction 46, path 48, junction 50, and path 52 to one input of multiplier 60, and via path 54, rectifier 56, and path 58 to a second input of multiplier 60. The circuit 56 is preferably a full wave rectifier, although this is not a requirement. The output of multiplier 60 is applied via path 62 to the inverting input of the operational amplifier 44 and is also applied via path 33 to the control input of the dynamic range extender 40. Selection of the parameters to set the unaffected level are well known and are not disclosed further here.

Figure 3:
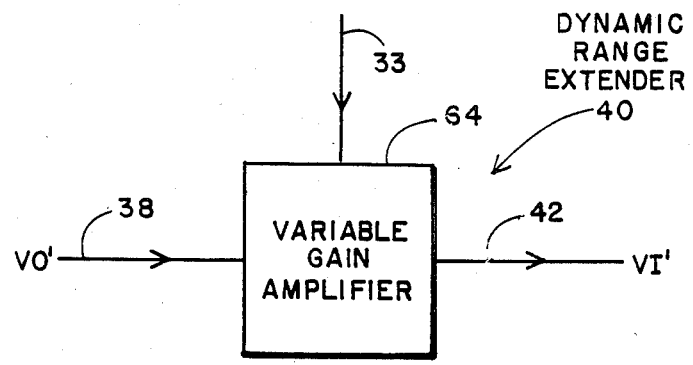
FIG. 3 is a simplified block diagram of a dynamic range extender which may be used in a preferred embodiment of the invention.

A very simple form of dynamic range extender is illustrated in FIG. 3 in which the processed output which appears at path 38 from the processing network 36 is applied to a variable gain amplifier 64 operating under control of the dynamic range limiter via the control signal path 33. The expanded output is applied via path 42 to one input of summing device 16.

While the invention has been particularly shown and described with reference to a preferred embodiment thereof, it will be understood by those skilled in the art that change in form and detail may be made therein without departing from the spirit and scope of the invention. For example, any complementary gain arrangement which limits the dynamic range of the signals applied to the arithmetic noise unit 36 would be effective in suppressing noise and could be employed in the invention as described herein. Further the technique may be employed to suppress algorithmic noise by limiting the dynamic range in an adaptive filtering arrangement.

Depending on signal conditions, the dynamic operation of this arrangement can interact with short-term fluctuations of signal energy. Operation of the circuit seems enhanced when the response time of the compressor/expandor is set to be significantly larger than the delay modeling capability of the echo canceller.

What is claimed is:

1. In a communication circuit which includes a four-wire to two-wire transition, a transmitting path and a receiving path in the four-wire circuit, an echo canceller interposed between said transmitting and receiving paths so as to adapt the signals passing along said transmitting and receiving paths into an echo replica for differential combination with signals passing along said transmitting path, apparatus for improving echo return loss enhancement comprising: first means for limiting the dynamic range of received signals before they enter processing means in the echo canceller for generating the echo replica, and for recovering the dynamic range subsequent thereto, whereby echo return loss enhancement is improved; said first means comprising: a dynamic range limiter interposed between an input to the processing means and said receiving path, so as to limit the dynamic range of signals to be adapted; and a dynamic range extender interposed between the output of the processing means and a combining means so as to restore the dynamic range of the echo replica at the output of said extender.

2. Apparatus as set forth in claim 1 wherein said dynamic range limiter is syllabic.

3. Apparatus as set forth in claim 2 wherein said dynamic range extender is slaved to said dynamic range limiter.

* * * * *